US00RE42178E

(19) United States
(12) Reissued Patent
Baldwin, Jr.

(10) Patent Number: US RE42,178 E
(45) Date of Reissued Patent: Mar. 1, 2011

(54) FIBER OPTIC CONVERSION SYSTEM AND METHOD

(75) Inventor: Carl G. Baldwin, Jr., Mansfield, TX (US)

(73) Assignee: Xylon LLC, Las Vegas, NV (US)

(21) Appl. No.: 11/409,544

(22) Filed: Apr. 20, 2006

Related U.S. Patent Documents

Reissue of:
(64) Patent No.: 6,723,978
Issued: Apr. 20, 2004
Appl. No.: 09/972,119
Filed: Oct. 5, 2001

(51) Int. Cl.
*G01J 1/04* (2006.01)

(52) U.S. Cl. ..... 250/227.11; 250/227.24
(58) Field of Classification Search ..... 250/227.11, 250/227.14, 227.24, 214 R; 385/8, 9, 27, 385/28; 455/554.1, 554.2, 555, 557, 560
See application file for complete search history.

(56) References Cited

U.S. PATENT DOCUMENTS 5,040,242 A * 8/1991 Tsuchiya et al. ..... 398/116
5,191,355 A * 3/1993 Kwak ..... 347/171
5,602,665 A * 2/1997 Asako ..... 398/137
5,708,265 A * 1/1998 Poole ..... 250/227.14
5,982,514 A * 11/1999 Suzuki et al. ..... 359/110
6,038,294 A * 3/2000 Tran et al. ..... 379/93.07

FOREIGN PATENT DOCUMENTS

GB 2333918 A * 8/1999

OTHER PUBLICATIONS

Murdock, Gary, and Goldie, John, National Semiconductor Application Note 702, "Buid a Direction–Sensing Bidirectional Repeater", AN010876, 7 pages, 1998.*
PCT International Search Report for PCT/US02/31064, 7 pages, Jun. 4, 2003.*

* cited by examiner

*Primary Examiner*—Que T Le

(57) ABSTRACT

A fiber optic conversion method is provided that includes receiving a first electrical signal. A second electrical signal is received. The first and second electrical signals are compared. A float signal is generated when the first and second electrical signals comprise substantially a same electrical signal. A determination is made regarding whether optical signals are being received. A light signal is generated while optical signals are being received. A driver mode is entered in response to the float signal and the light signal being generated simultaneously. The driver mode is remained in while the light signal is being generated.

38 Claims, 4 Drawing Sheets

20

114b
114a
114c
116a
116b
116c
112c
112b
112a
110
92
136
134a
138
118
66
FROM FIG. 3A
134b
140
124a
120
124b
122
70

FIBER OPTIC CONVERSION SYSTEM AND METHOD

Matter enclosed in heavy brackets [ ] appears in the original patent but forms no part of this reissue specification; matter printed in italics indicates the additions made by reissue.

TECHNICAL FIELD OF THE INVENTION

This invention relates generally to fiber optic communication and-more particularly to a fiber optic conversion system and method.

BACKGROUND OF THE INVENTION

Electrical data systems that communicate over cables are sensitive to noise and generally limited in terms of distance between components coupled together by such cables. One solution to this problem is the use of fiber optic links between-components.

Fiber optic links are relatively insensitive to noise and allow for great distances between components. However, disadvantages associated with incorporating fiber optic links into existing electrical systems include the need for protocol logic processing or an enable status line.

Thus, fiber optic communication may not be possible in systems in which enable status lines are unavailable without complex protocol-specific fiber optic converters to convert the electrical signals into fiber optic signals. In addition, utilizing either protocol logic processing or an enable status line to implement a fiber optic converter is relatively expensive in terms of labor and equipment.

SUMMARY OF THE INVENTION

In accordance with the present invention, a fiber optic conversion system and method are provided that substantially eliminate or reduce disadvantages and problems associated with previously developed systems and methods. In particular, fiber optic converters may be implemented without the use of protocol logic processing or an enable status line.

In one embodiment of the present invention, a fiber optic conversion method is provided that includes receiving a first electrical signal. A second electrical signal is received. The first and second electrical signals are compared. A float signal is generated when the first and second electrical signals comprise substantially a same electrical signal. A determination is made regarding whether optical signals are being received. A light signal is generated while optical signals are being received. A driver mode is entered in response to the float signal and the light signal being generated simultaneously. The driver mode is remained in while the light signal is being generated.

Technical advantages of one or more embodiments of the present invention include providing an improved fiber optic conversion method. In a particular embodiment, the fiber optic converter monitors the fiber optic link for a driver and becomes a driver itself when none is detected. The fiber optic converter becomes a receiver when fiber optic signals are no longer being received. Accordingly, there is no need for an enable status line or protocol monitoring circuitry. As a result, fiber optic links may be established between major nodes of existing electrical systems more inexpensively. In addition, fiber optic communication may be provided in systems in which enable status lines are unavailable.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
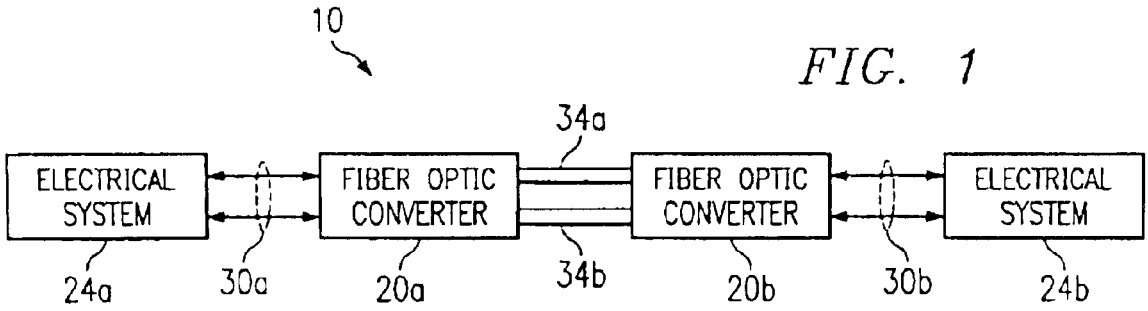
FIG. 1 is a block diagram illustrating a fiber optic conversion system comprising fiber optic converters in accordance with one embodiment of the present invention.

FIG. 1 is a block diagram illustrating a fiber optic conversion system 10 comprising fiber optic converters 20 in accordance with one embodiment of the present invention. The conversion system 10 may comprise a commercial avionic system, a military avionic system, a data communication system, or other suitable system.

The conversion system 10 comprises two fiber optic converters 20 and two electrical systems 24, in addition to two buses 30 and two fiber optic lines 34. The two electrical systems 24 may be closely coupled together or may be remote from each other and located virtually anywhere with respect to each other, provided that fiber optic lines 34 are available to couple the fiber optic converters 20 to each other.

Each electrical system 24 is operable to communicate over a bus 30. As used herein, "each" means every one of at least a subset of the identified items. Each bus 30 comprises at least two bi-directional lines, with one line carrying a digital signal and the other line carrying the complement of the digital signal carried on the first line. For example, the bus 30 may comprise an EIA-485 or other suitable bus.

Each fiber optic converter 20 is operable to communicate with its corresponding electrical system 24 through the corresponding bus 30, as well as with another fiber optic converter 20 through the fiber optic lines 34. Thus, the fiber optic converters 20 are operable to provide fiber optic communication between the electrical systems 24 through the buses 30 for the electrical systems 24.

In accordance with one embodiment, fiber optic line 34a may provide optical signals from fiber optic converter 20a to fiber optic converter 20b, while fiber optic line 34b provides optical signals from fiber optic converter 20b to fiber optic converter 20a. However, it will be understood that the fiber optic lines 34 may be otherwise suitably implemented without departing from the scope of the present invention. For example, fiber optic line 34a may provide optical signals from fiber optic converter 20b to fiber optic converter 20a while fiber optic line 34b provides optical signals from fiber optic converter 20a to fiber optic converter 20b.

In operation, the electrical system 24a may communicate with the electrical system 24b by transmitting information through the bus 30a to the fiber optic converter 20a. The fiber optic converter 20a is in a receiver mode at this point. The receiver mode corresponds to the mode in which the fiber optic converter 20 is receiving electrical signals from the bus 30 and generating optical signals for transmission over a fiber optic line 34.

Thus, according to one embodiment, the fiber optic converter 20a converts the electrical signals from the system 24a into optical signals and transmits them to the fiber optic converter 20b over the fiber optic line 34a. The fiber optic converter 20b is in the driver mode at this point. The driver mode corresponds to the mode in which the fiber optic converter 20 is receiving optical signals over a fiber optic line 34 and generating electrical signals for transmission over the bus 30. The fiber optic converter 20b enters the driver mode based on detecting floating lines for the bus 30b and detecting optical signals on the fiber optic line 34a, as described in more detail below.

After receiving the optical signals, the fiber optic converter 20b converts the optical signals into electrical signals and transmits them to the system 24b over the bus 30b. The system 24b may then transmit information back to the system 24a in a similar manner, using fiber optic line 34b.

Figure 2:
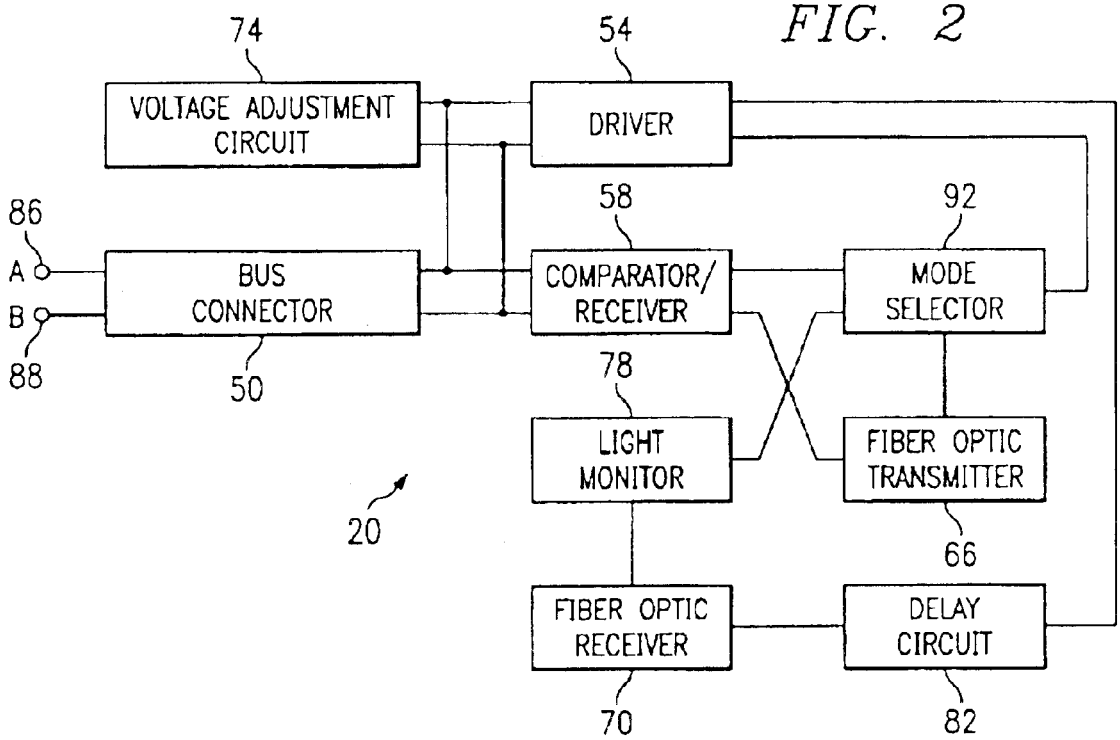
FIG. 2 is a block diagram illustrating the fiber optic converter of FIG. 1 in accordance with one embodiment of the present invention.

FIG. 2 is a block diagram illustrating the fiber optic converter 20 in accordance with one embodiment of the present invention. The fiber optic converter 20 comprises a bus connector 50, a driver 54, a comparator/receiver 58, a fiber optic transmitter 66, a fiber optic receiver 70, a voltage adjustment circuit 74, a light monitor 78, a delay circuit 82, and a mode selector 92.

Any or all of the bus connector 50, the driver 54, the comparator/receiver 58, the fiber optic transmitter 66, the fiber optic receiver 70, the voltage adjustment circuit 74, the light monitor 78, the delay circuit 82, and the mode selector 92 may comprise logic encoded in media. The logic comprises functional instructions for carrying out program tasks. The media comprises computer disks or other computer-readable media, application-specific integrated circuits, field-programmable gate arrays, digital signal processors, other suitable specific or general-purpose processors, transmission media or other suitable media in which logic may be encoded and utilized.

The bus connector 50 is operable to receive electrical input signals from the bus 30 and transmit electrical output signals to the bus 30 through terminal A 86 and terminal B 88. The bus connector 50 also receives a power supply and a ground (not shown in FIG. 2) from the bus 30 for use in the fiber optic converter 20.

The driver 54 is coupled to the bus connector 50. The driver 54 is operable to provide output signals to the bus connector 50 for transmission to the bus 30 when the fiber optic converter 20 is in the driver mode.

The comparator/receiver 58 is also coupled to the bus connector 50 and is operable to receive input signals from the bus 30 through the bus connector 50 when the fiber optic converter 20 is in the receiver mode. The comparator/receiver 58 is also operable to compare the signals received from the bus connector 50 and to provide a float signal to the mode selector 92 when the comparator/receiver 58 determines that the signals are floating, i.e., the signals are substantially the same, instead of being complementary as non-floating input signals from the bus 30 would be.

The fiber optic transmitter 66 is coupled to the comparator/receiver 58 and is operable to receive electrical input signals from the bus 30 via the bus connector 50 and the comparator/receiver 58. The fiber optic transmitter 66 is also operable to convert the electrical input signals into optical signals and to generate optical signals for transmission along a fiber optic line 34 to another device, such as another fiber optic converter 20 coupled to a system 24 or other suitable receiving device.

The fiber optic receiver 70 is coupled to the delay circuit 82 and is operable to receive optical signals from a fiber optic line 34 to another device, such as another fiber optic converter 20 coupled to a system 24 or other suitable transmitting device. The fiber optic receiver 70 is also operable to convert the optical signals into electrical output signals and to provide the electrical output signals to the driver 54 via the delay circuit 82 for transmission to the bus 30 via the bus connector 50.

The voltage adjustment circuit 74 is coupled to the bus connector 50, the driver 54, and the comparator/receiver 58. The voltage adjustment circuit 74 is operable to cause the signals from the bus connector 50 to the driver 54 and to the comparator/receiver 58 to float to a specified common voltage potential. According to one embodiment, the specified common voltage potential comprises approximately 5.0 volts. However, it will be understood that the specified common voltage potential may comprise any suitable voltage potential without departing from the scope of the present invention.

The light monitor 78 is coupled to the fiber optic receiver 70. The light monitor 78 is operable to determine whether or not the fiber optic receiver 70 is receiving optical signals. The light monitor 78 is also operable to provide a light signal to the mode selector 92 when the light monitor 78 determines that the fiber optic receiver 70 is receiving optical signals.

The delay circuit 82 is coupled to the fiber optic receiver 70 and to the driver 54. The delay circuit 82 is operable to delay any electrical signals generated by the fiber optic receiver 70 in response to received optical signals before providing the electrical signals to the driver 54 for transmission to the bus 30 via the bus connector 50 when the fiber optic converter 20 is in the driver mode. As used herein, a first event is said to occur "in response to" a second event when the first event subsequently follows and is a result of the second event. The first event need not immediately follow the second event.

The mode selector 92 is coupled to the comparator/receiver 58 and to the light monitor 78. The mode selector 92 is operable to receive a float signal from the comparator/receiver 58 and to receive a light signal from the light monitor 78. Based on the presence or absence of these signals, the mode selector 92 is operable to place the fiber optic converter 20 into either the driver mode or the receiver mode by providing a corresponding signal to the driver 54.

In addition, the mode selector 92 is coupled to the fiber optic transmitter 66 and is operable to enable the fiber optic transmitter 66, such that the fiber optic transmitter 66 may transmit optical signals, when the fiber optic converter 20 is in the receiver mode and to disable the fiber optic transmitter 66, such that the fiber optic transmitter 66 will not transmit optical signals, when the fiber optic converter 20 is in the driver mode.

In operation, the fiber optic converter 20 may begin in the receiver mode. While in the receiver mode, the bus connector 50 receives electrical signals from the bus 30 at terminals A 86 and B 88. The comparator/receiver 58 receives these electrical signals from the bus connector 50 and provides them to the fiber optic transmitter 66 for transmission along a fiber optic line 34. In addition, the comparator/receiver 58 does not generate a float signal for the mode selector 92 because the signals corresponding to terminals A 86 and B 88 are not substantially the same, but rather are complementary values.

After electrical signals are not received at terminals A 86 and B 88, the voltage adjustment circuit 74 causes the signals corresponding to the terminals A 86 and B 88 to float to the specified common voltage potential. The comparator/receiver 58 then detects that the signals are substantially the same and generates the float signal for the mode selector 92. The fiber optic converter 20 remains in the receiver mode, however, until the light monitor 78 detects light from the fiber optic receiver 70. If no light is received, electrical signals may again be received at terminals A 86 and B 88 and the float signal will no longer be generated.

However, if the light monitor 78 does detect light from the fiber optic receiver 70, the light monitor 78 generates the light signal for the mode selector 92. If the mode selector 92 is receiving both the float signal and the light signal simultaneously, the mode selector 92 provides a signal to the driver 54 that converts the fiber optic converter 20 to the driver mode.

The delay circuit 82 delays the optical signal for a period of time sufficient to allow the fiber optic converter 20 to enter the driver mode such that the driver 54 is ready to process the optical signal when it is received from the fiber optic receiver 70.

While in the driver mode, the fiber optic converter 20 receives optical signals at the fiber optic receiver 70, the fiber optic receiver 70 converts the optical signals to electrical signals and provides them to the driver 54 through the delay circuit 82, and the driver 54 provides the electrical signals to the bus connector 50 for transmission through terminals A 86 and B 88 to the bus 30.

The fiber optic converter 20 remains in the driver mode until the light monitor 78 no longer generates the light signal. Thus, the float signal may be removed from the mode selector 92 once the fiber optic converter 20 has entered the driver mode, as will be the case when the signals corresponding to terminals A 86 and B 88 become complementary electrical signals for transmission over the bus 30.

However, once the light signal is no longer generated by the light monitor 78, the mode selector 92 returns the fiber optic converter 20 to the receiver mode. According to one embodiment, an adjustable delay may be included such that the light monitor 78 may continue to generate the light signal for an amount of time corresponding to the delay before the light monitor 78 no longer generates the light signal.

At this point, the fiber optic converter 20 may reenter the driver mode if the float and light signals are again received simultaneously at the mode selector 92. Alternatively, the fiber optic converter 20 may remain in the receiver mode and begin receiving electrical signals.

Figure 3A:
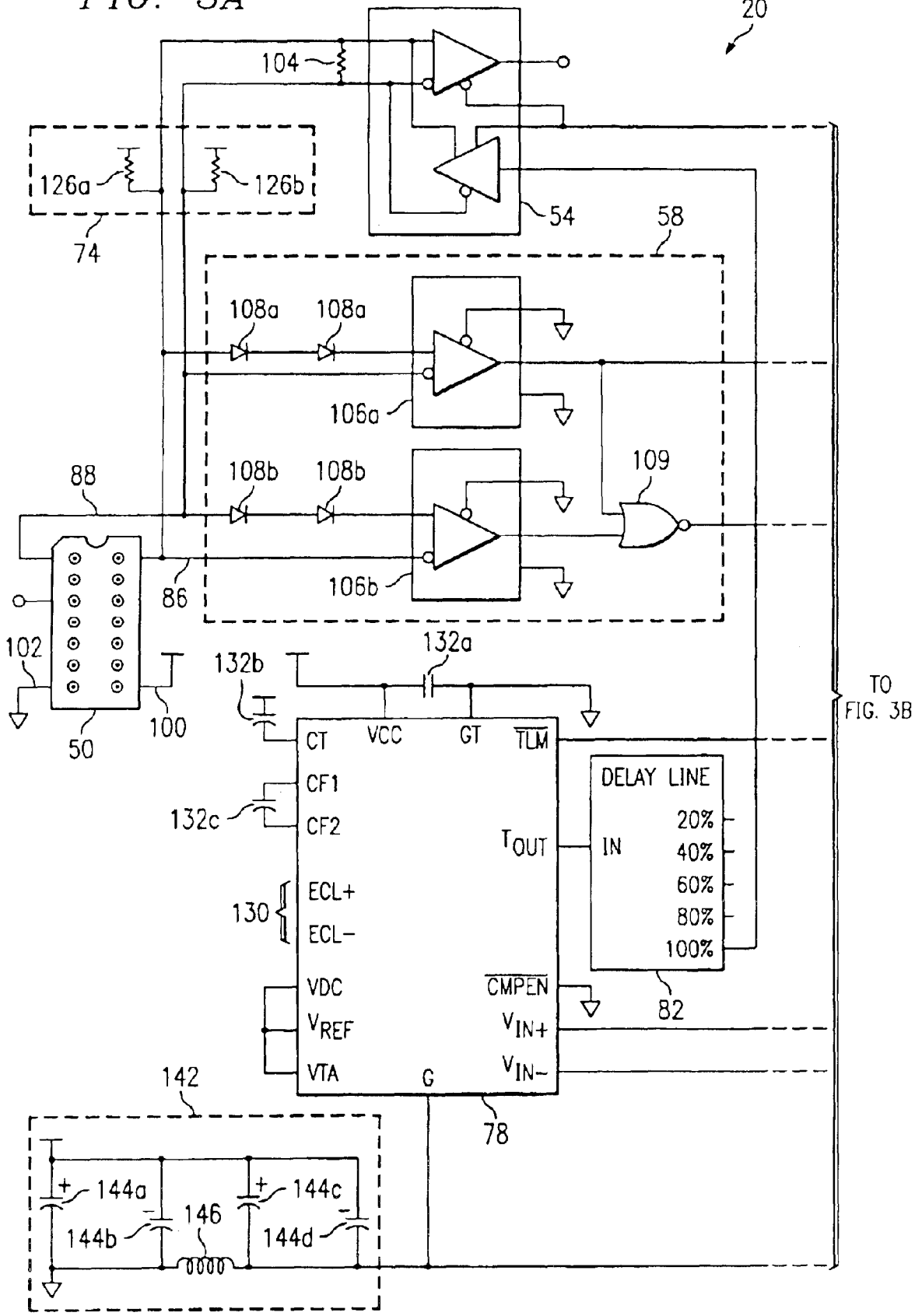
FIGS. 3A and 3B are schematic diagrams illustrating the fiber optic converter of FIG. 1 in accordance with one embodiment of the present invention.
Figure 3B:
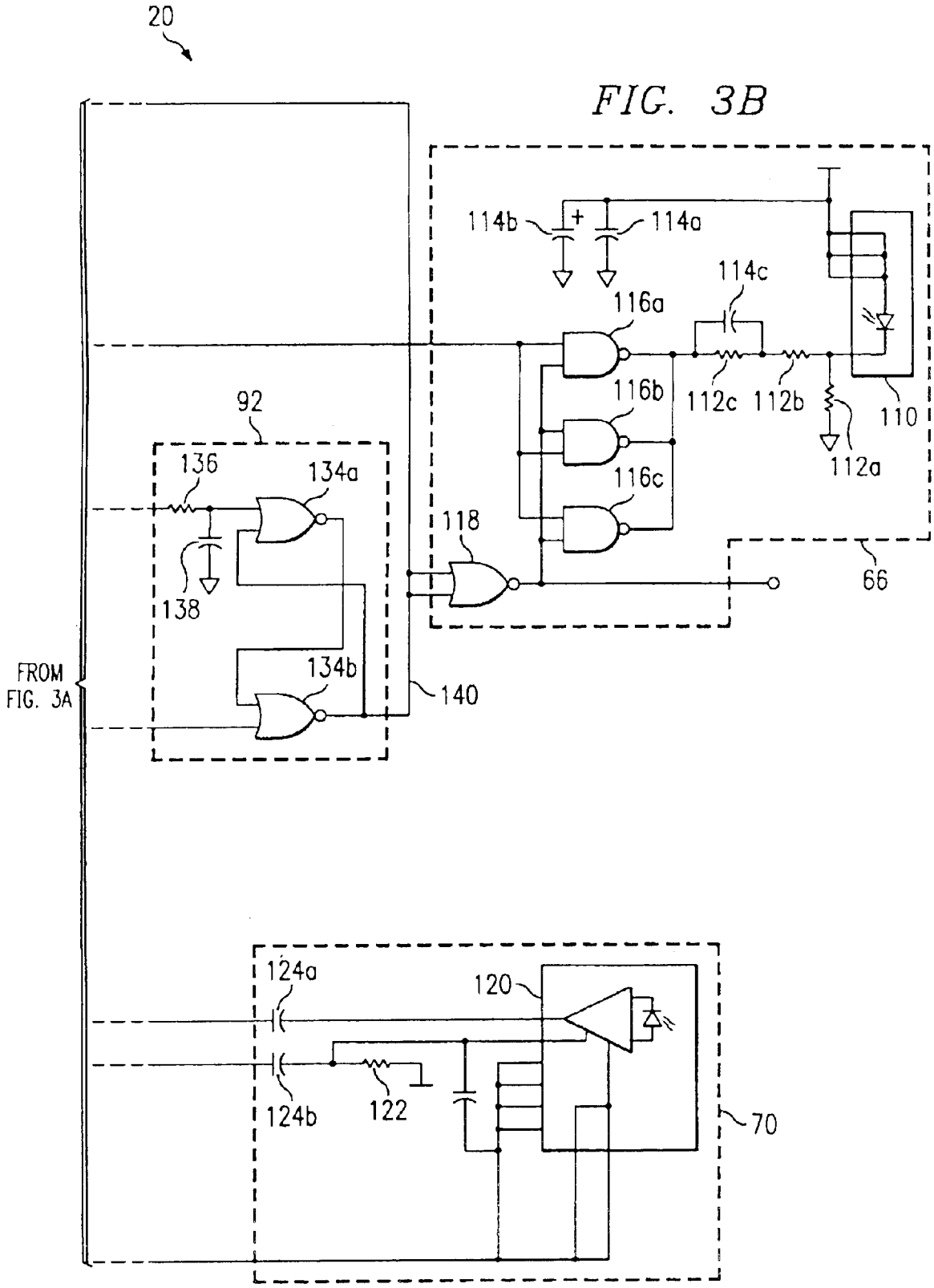

FIG. 3 is a schematic diagram illustrating the fiber optic converter 20 in accordance with one embodiment of the present invention. According to this embodiment, the bus connector 50 comprises a 14-pin connector that is operable to receive and transmit signals from the terminals A 86 and B 88.

The bus connector 50 is also operable to receive a power supply 100 and a ground 102 from the bus 30. The power supply 100 supplies a higher potential than the ground 102. According to one embodiment, the power supply 100 provides a potential of approximately 5.0 volts and the ground 102 provides a potential of approximately 0.0 volts. However, it will be understood that the power supply 100 and the ground 102 may provide any suitable potentials without departing from the scope of the present invention.

According to one embodiment, the driver 54 comprises an LTC-1485 or other suitable transceiver chip operable to drive an electrical signal. A resistor 104 may be used between the lines corresponding to terminals A 86 and B 88 to ensure proper transmission line impedance matching to the electrical system 24.

According to one embodiment, the comparator/receiver 58 comprises a pair of LTC-1485 or other suitable transceiver chips 106 operable to receive electrical signals. For this embodiment, the comparator/receiver 58 also comprises a pair of diodes 108 for each transceiver chip 106 and a NOR gate 109. The diodes 108 are operable to reduce the voltage of the signals received from terminals A 86 and B 88.

Thus, for the upper transceiver chip 106a, the signal from terminal A 86 is reduced approximately 1.2 volts by the diodes 108a, while the signal from terminal B 88 is not reduced. For the lower transceiver chip 106b, the signal from terminal B 88 is reduced approximately 1.2 volts by the diodes 108b, while the signal from terminal A 86 is not reduced. According to one embodiment, the specified common voltage potential provided by the voltage adjustment circuit 74 comprises a voltage that is greater than the voltage drop from terminals A 86 and B 88 to the transceiver chips 106. Thus, for the embodiment in which a pair of diodes 108 are used to reduce the voltage, the specified common voltage potential may comprise a potential greater than approximately 1.2 volts.

When the signals from terminals A 86 and B 88 are substantially the same due to the voltage adjustment circuit 74 causing the signals to float to the specified common voltage potential, the upper transceiver chip 106a senses that the signal from terminal A 86 is less than the signal from terminal B 88, while the lower transceiver chip 106b senses that the signal from terminal B 88 is less than the signal from terminal A 86. In this situation, the NOR gate 109 goes high based on the low signals from both transceiver chips 106. This high signal from the NOR gate 109 is provided to the mode selector 92 as the float signal.

Similarly, when the voltage adjustment circuit 74 is not causing the signals to float to the specified common voltage potential, both transceiver chips 106 sense that the signal from the same terminal A 86 or B 88 is less than the other signal, resulting in a high signal for one of the transceiver chips 106. In this situation, the NOR gate 109 goes low, and the float signal is not provided to the mode selector 92. The fiber optic transmitter 66 comprises an HFBR-1414 or other suitable transmitter 110 operable to receive an electrical signal and generate an optical signal in response to the electrical signal. The transmitter 110 is also operable to be enabled by the mode selector 92 when the fiber optic converter 20 is in the receiver mode and to be disabled by the mode selector 92 when the fiber optic converter 20 is in the driver mode.

The fiber optic transmitter 66 also comprises a plurality of resistors 112, a plurality of capacitors 114, a plurality of NAND gates 116, and a NOR gate 118. These components 112, 114, 116 and 118 may be used to provide the appropriate electrical signal to the transmitter 110 to cause the transmitter 110 to generate an optical signal. For example, the NOR gate 118 may be used to invert the signal received from the mode selector 92.

According to one embodiment, the resistor 112a comprises a relatively high resistance, such as approximately 1300Ω, in order to ensure that no optical signal is inadvertently transmitted at the wrong moment. However, it will be understood that the resistor 112a may comprise any suitable resistance, such as at least 270Ω, without departing from the scope of the present invention.

According to one embodiment, the resistors 112b and 112c each comprise a resistance of approximately 33.2Ω, the capacitor 114a comprises a capacitance of approximately 100 nF, the capacitor 114b comprises a capacitance of approximately 22 μF, and the capacitor 114c comprises a capacitance of approximately 100 pF. However, it will be understood that the resistors 112b and 112c may comprise any suitable resistance and the capacitors 114 may comprise any suitable capacitance without departing from the scope of the present invention.

The fiber optic receiver 70 comprises an HFBR-2416 or other suitable receiver 120 operable to receive an optical signal and generate an electrical signal in response to the optical signal. The fiber optic receiver 70 also comprises a resistor 122 and a plurality of capacitors 124. These components 122 and 124 may be used to generate the appropriate electrical signal in response to the received optical signal.

According to one embodiment, the resistor 122 comprises a resistance of approximately 10Ω, and the capacitors 124a and 124b each comprise a capacitance of approximately 100 pF. However, it will be understood that the resistor 122 may comprise any suitable resistance and the capacitors 124 may comprise any suitable capacitance without departing from the scope of the present invention.

The voltage adjustment circuit 74 comprises a plurality of resistors 126. According to one embodiment, the resistors 126a and 126b each comprise a resistance of approximately 1330Ω. However, it will be understood that the resistors 126 may comprise any suitable resistance without departing from the scope of the present invention.

According to one embodiment, the light monitor 78 comprises a fiber optic data quantizer 130, such as an ML4622 or other suitable fiber optic data quantizer. The quantizer 130 may be coupled to a plurality of capacitors 132. An adjustable delay may be included such that the light monitor 78 may continue to generate the light signal for an amount of time corresponding to the delay before the light monitor 78 no longer generates the light signal. For example, the delay may be included by the fiber optic data quantizer and may be adjustable based on the capacitor bias associated with the quantizer.

According to one embodiment, the capacitor 132a comprises a capacitance of approximately 100 nF, the capacitor 132b comprises a capacitance of approximately 10 pF, and the capacitor 132c comprises a capacitance of approximately 4.7 pF. However, it will be understood that the capacitors 132 may comprise any suitable capacitance without departing from the scope of the present invention.

According to one embodiment, the delay circuit 82 comprises a DS1000 chip. However, it will be understood that the delay circuit 82 may comprise any suitable components operable to delay the electrical signals generated by the fiber optic receiver 70 for a period of time sufficient to allow the light monitor 78 to generate the light signal for the mode selector 92.

The mode selector 92 comprises a pair of cross-coupled NOR gates 134, a resistor 136, and a capacitor 138. The two NOR gates 134 together function as a latch. The NOR gate 134a is operable to receive the float signal from the comparator/receiver 58, while the NOR gate 134b is operable to receive the light signal from the light monitor 78.

According to the illustrated embodiment, the float signal corresponds to a high signal, while the light signal corresponds to a low signal. Thus, when the float signal and the light signal are activated, the mode selector 92 activates the enable line 140, which places the fiber optic converter 20 into the driver mode.

Because the NOR gates 134 function as a latch of the float signal, the enable line 140 remains high, keeping the fiber optic converter 20 in the driver mode, until the light monitor 78 no longer generates the light signal, i.e., until the signal goes high. Thus, when the light monitor 78 no longer detects light being received at the fiber optic receiver 70, the signal goes high and the fiber optic converter 20 returns to the receiver mode.

According to one embodiment, the fiber optic converter 20 may also comprise a noise reducer 142. The noise reducer is coupled to a ground for the fiber optic data quantizer 130 and is operable to reduce noise in the ground signal for the quantizer 130 by eliminating alternating current noise from the ground signal.

According to one embodiment, the noise reducer 142 comprises a plurality of capacitors 144 and an inductor 146. The capacitors 144a and 144c each comprise a capacitance of approximately 22 μF, the capacitors 144b and 144d each comprise a capacitance of approximately 100 nF, and the inductor 146 comprises an inductance of approximately 15 μH. However, it will be understood that the capacitors 144 may comprise any suitable capacitance and the inductor 146 may comprise any suitable inductance without departing from the scope of the present invention.

Figure 4:
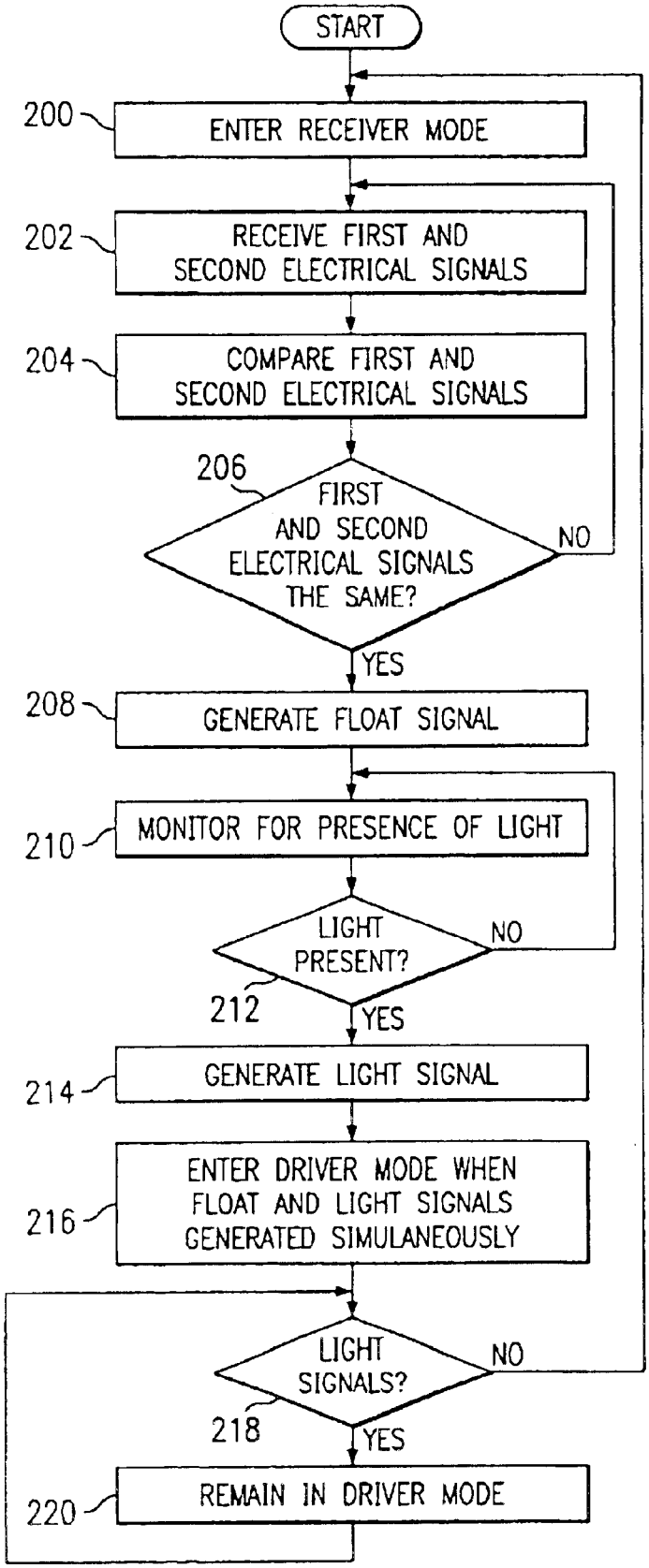
FIG. 4 is a flow diagram illustrating a fiber optic conversion method for the fiber optic converter of FIG. 1 in accordance with one embodiment of the present invention.

FIG. 4 is a flow diagram illustrating a fiber optic conversion method for the fiber optic converter 20 in accordance with one embodiment of the present invention. The method begins at step 200 where the fiber optic converter 20 enters the receiver mode. At step 202, the comparator/receiver 58 receives first and second electrical signals from the bus connector 50 based on the signals from terminals A 86 and B 88. At step 204, the comparator/receiver 58 compares the first and second electrical signals.

At decisional step 206, the comparator/receiver 58 determines whether or not the first and second electrical signals are the same. According to one embodiment, the comparator/receiver 58 determines whether or not the first and second electrical signals are the same based on whether or not the voltages associated with each electrical signal are substantially the same. In addition, the electrical signals may be substantially the same as a result of the voltage adjustment circuit 74 causing the signals to float. However, it will be understood that the comparator/receiver 58 may determine whether or not the first and second electrical signals are the same based on any suitable criteria without departing from the scope of the present invention.

If the comparator/receiver 58 determines that the first and second electrical signals are not the same, the method follows the No branch from decisional step 206 and returns to step 202 where the comparator/receiver 58 continues to receive first and second electrical signals from the bus connector 50.

However, if the comparator/receiver 58 determines that the first and second electrical signals are the same, the method follows the Yes branch from decisional step 206 to step 208. At step 208, the comparator/receiver 58 generates a float signal for the mode selector 92 while the first and second electrical signals remain the same.

At step 210, the light monitor 78 monitors the fiber optic receiver 70 for the presence of light received over a fiber optic line 34. At decisional step 212, the light monitor 78 determines whether or not light is present. If light is not present, the method follows the No branch from decisional step 212 and returns to step 210 where the light monitor 78 continues to monitor the fiber optic receiver 70 for the presence of light.

However, if light is present, the method follows the Yes branch from decisional step 212 to step 214. At step 214, the light monitor 78 generates a light signal for the mode selector 92 while light remains present. At step 216, the fiber optic converter 20 enters the driver mode when the float signal and the light signal are being generated simultaneously.

At decisional step 218, the mode selector 92 determines whether or not the light monitor 78 is continuing to generate the light signal. According to one embodiment, the light monitor 78 may continue to generate the light signal for an amount of time corresponding to an adjustable delay before the light monitor 78 no longer generates the light signal.

If the light monitor 78 is continuing to generate the light signal, the method follows the Yes branch from decisional step 218 to step 220. At step 220, the fiber optic converter 20 remains in the driver mode. At this point, the method returns to decisional step 218. In this way, the fiber optic converter 20 remains in the driver mode until the light monitor 78 is no longer generating the light signal.

Returning to decisional step 218, if the light monitor 78 is no longer generating the light signal, the method follows the No branch from decisional step 218 and returns to step 200, where the fiber optic converter 20 returns to the receiver mode.

In this way, a fiber optic converter 20 may be implemented without the use of protocol logic processing or an enable status line by allowing the fiber optic converter to monitor the fiber optic line 34 for a driver and to become a driver when no driver is detected. The fiber optic converter 20 also reverts back to being a receiver when optical signals are no longer being received. Therefore, fiber optic communication may be established relatively easily and inexpensively between existing electrical systems 24 and may be provided in electrical systems 24 in which enable status lines are unavailable.

Although the present invention has been described with several embodiments, various changes and modifications may be suggested to one skilled in the art. It is intended that the present invention encompass such changes and modifications as fall within the scope of the appended claims.

What is claimed is:

1. A fiber optic conversion method, comprising:

receiving a first electrical signal;

receiving a second electrical signal;

comparing the first and second electrical signals;

generating a float signal when the first and second electrical signals comprise substantially a same electrical signal;

determining whether optical signals are being received;

generating a light signal while optical signals are being received;

entering a driver mode in response to the float signal and the light signal being generated simultaneously; and remaining in the driver mode while the light signal is being generated.

2. The method of claim 1, further comprising entering a receiver mode when the light signal is no longer being generated.

3. The method of claim 1, comparing the first and second electrical signals comprising comparing a voltage for the first electrical signal to a voltage for the second electrical signal, and generating a float signal comprising generating the float signal when the voltage for the first electrical signal and the voltage for the second electrical signal comprise substantially a same voltage.

4. The method of claim 1, further comprising no longer generating the float signal when the first and second electrical signals comprise a different electrical signal.

5. The method of claim 1, further comprising:

converting the received optical signals into electrical signals;

delaying the converted electrical signals;

providing the delayed electrical signals to a driver.

6. The method of claim 5, further comprising:

providing the electrical signals from the driver to a bus; and transmitting the electrical signals over the bus.

7. A fiber optic converter, comprising:

a bus connector operable to receive input signals from a bus and to transmit output signals to the bus;

a driver coupled to the bus connector, the driver operable to provide output signals to the bus connector for transmission to the bus when the fiber optic converter is in a driver mode;

a comparator/receiver coupled to the bus connector, the comparator/receiver operable to receive input signals from the bus through the bus connector when the fiber optic converter is in a receiver mode;

a voltage adjustment circuit coupled to the bus connector, the voltage adjustment circuit operable to cause the input signals from the bus connector to float when signals are not being received over the bus at the bus connector;

a mode selector coupled to the comparator/receiver, the comparator/receiver further operable to compare the input signals received from the bus connector and to provide a float signal to the mode selector when the comparator/receiver determines that the signals are floating;

a light monitor coupled to the mode selector, the light monitor operable to determine whether or not the fiber optic converter is receiving optical signals and to provide a light signal to the mode selector when the light monitor determines that the fiber optic converter is receiving optical signals; and the mode selector operable to receive the float signal from the comparator/receiver and to receive the light signal from the light monitor and to place the fiber optic converter into either the driver mode or the receiver mode based on the presence of the float signal and the light signal.

8. The fiber optic converter of claim 7, further comprising a fiber optic transmitter coupled to the comparator/receiver, the fiber optic transmitter operable to receive input signals from the bus via the bus connector and the comparator/receiver and to convert the input signals into optical signals.

9. The fiber optic converter of claim 8, the fiber optic transmitter also coupled to the mode selector, the mode selector operable to enable the fiber optic transmitter when the fiber optic converter is in the receiver mode and to disable the fiber optic transmitter when the fiber optic converter is in the driver mode.

10. The fiber optic converter of claim 7, further comprising a fiber optic receiver coupled to the driver, the fiber optic receiver operable to receive optical signals, to convert the optical signals into output signals, and to provide the output signals to the driver.

11. The fiber optic converter of claim 10, further comprising a delay circuit coupled between the fiber optic receiver and the driver, the delay circuit operable to delay the output signals provided by the fiber optic receiver before providing the output signals to the driver.

12. The fiber optic converter of claim 7, the driver comprising a transceiver chip.

13. The fiber optic converter of claim 7, the comparator/receiver comprising a plurality of transceiver chips.

14. The fiber optic converter of claim 7, the voltage adjustment circuit comprising a plurality of resistors.

15. The fiber optic converter of claim 7, the mode selector comprising a latch.

16. A fiber optic conversion system, comprising:

a computer-processable medium; and logic stored on the computer-processable medium, the logic operable to receive a first electrical signal, to receive a second electrical signal, to compare the first and second electrical signals, to generate a float signal when the first and second electrical signals comprise substantially a same electrical signal, to determine whether optical signals are being received, to generate a light signal while optical signals are being received, to enter a driver mode in response to the float signal and the light signal being generated simultaneously, and to remain in the driver mode while the light signal is being generated.

17. The system of claim 16, the logic further operable to enter a receiver mode when the light signal is no longer being generated.

18. The system of claim 16, the logic further operable to compare the first and second electrical signals by comparing a voltage for the first electrical signal to a voltage for the second electrical signal, and to generate a float signal by generating the float signal when the voltage for the first electrical signal and the voltage for the second electrical signal comprise substantially a same voltage.

19. The system of claim 16, the logic further operable to no longer generate the float signal when the first and second electrical signals comprise a different electrical signal.

20. The system of claim 16, the logic further operable to convert the received optical signals into electrical signals, to delay the converted electrical signals, and to provide the delayed electrical signals to a driver.

21. The system of claim 20, the logic further operable to provide the electrical signals from the driver to a bus and to transmit the electrical signals over the bus.

*22. A converter comprising:*

*an optical signal receiver;*

*an electrical signal driver; and*

*a mode selector capable of switching said converter between modes in response to detecting changes in at least one of a floating voltage signal and a light signal;*

*wherein said modes comprise a receiver mode and a driver mode.*

*23. The converter of claim 22, further comprising:*

*an electrical signal comparator configured to generate the floating voltage signal; and*

*a light monitor configured to detect that the optical signal receiver is receiving optical signals and generate the light signal.*

*24. The converter of claim 22, wherein in the driver mode:*

*the optical signal receiver is configured to receive optical signals; and*

*the electrical signal driver is configured to transmit electrical signals corresponding to the received optical signals; and*

*wherein the mode selector is configured to switch the converter to receiver mode after the optical receiver stops receiving optical signals.*

*25. The converter of claim 24, further comprising:*

*an electrical signal receiver; and*

*an optical transmitter;*

*wherein in the receiver mode:*

*the electrical signal receiver is configured to receive electrical signals from an electrical system coupled to the converter; and*

*the optical transmitter is configured to transmit optical signals corresponding to the received electrical signals; and*

*wherein the mode selector is configured to switch the converter to driver mode in response to the optical receiver receiving optical signals at substantially the same time the electrical signal receiver is not receiving electrical signals.*

*26. An apparatus comprising:*

*one or more fiber optic communications lines;*

*two electrical systems and two converters, wherein at least a first one of the converters comprises:*

*an optical signal receiver;*

*an electrical signal driver; and*

*a mode selector capable of switching the first converter between modes in response to detecting changes in at least one of a floating voltage signal and a light signal;*

*wherein said modes comprise a receiver mode and a driver mode.*

*27. The apparatus of claim 26, wherein the first converter further comprises:*

*an electrical signal comparator configured to generate the floating voltage signal; and*

*a light monitor configured to detect that the optical signal receiver is receiving optical signals and generate the light signal.*

*28. The apparatus of claim 26, wherein in the driver mode:*

*the optical signal receiver is configured to receive optical signals; and*

*the electrical signal driver is configured to transmit electrical signals corresponding to the received optical signals; and*

*wherein the mode selector is configured to switch the first converter to receiver mode after the optical receiver stops receiving optical signals.*

*29. The apparatus of claim 26, wherein the first converter further comprises:*

*an electrical signal receiver; and*

*an optical transmitter;*

*wherein in the receiver mode:*

*the electrical signal receiver is configured to receive electrical signals from an electrical system coupled to the first converter; and*

*the optical transmitter is configured to transmit optical signals corresponding to the received electrical signals; and*

*wherein the mode selector is configured to switch the first converter to driver mode in response to the optical receiver receiving optical signals at substantially the same time the electrical signal receiver is not receiving electrical signals.*

*30. A method comprising:*

*in a signal converter including an optical signal receiver, an electrical signal driver and a mode selector, switching between modes of said signal converter in response to detecting changes in at least one of a floating voltage signal and a light signal;*

*wherein said modes comprise a receiver mode and a driver mode.*

*31. The method of claim 30, wherein the signal converter further comprises:*

*an electrical signal comparator configured to generate the floating voltage signal; and*

*a light monitor configured to detect that the optical signal receiver is receiving optical signals and generate the light signal.*

*32. The method of claim 30, wherein in the driver mode:*

*the optical signal receiver is configured to receive optical signals; and*

*the electrical signal driver is configured to transmit electrical signals corresponding to the received optical signals; and*

*wherein the mode selector is configured to switch the signal converter to receiver mode after the optical receiver stops receiving optical signals.*

*33. The method of claim 32, wherein the signal converter further comprises:*

*an electrical signal receiver; and*

*an optical transmitter;*

*wherein in the receiver mode:*

*the electrical signal receiver is configured to receive electrical signals from an electrical system coupled to the signal converter; and*

*the optical transmitter is configured to transmit optical signals corresponding to the received electrical signals; and*

*wherein the mode selector is configured to switch the signal converter to driver mode in response to the optical receiver receiving optical signals at substantially the same time the electrical signal receiver is not receiving electrical signals.*

*34. A converter comprising:*

*a first means for receiving optical signal;*

*a second means for driving electrical signals; and*

*a third means for switching the converter between modes in response to detecting changes in at least one of a floating voltage signal and a light signal;*

*wherein said modes comprise a receiver mode and a driver mode.*

*35. The converter of claim 34, further comprising*

*a fourth means for receiving electrical signals; and*

*a fifth means for transmitting optical signals;*

*wherein in the driver mode, the first means is configured to receive optical signals and the second means is configured to transmit electrical signals corresponding to the received optical signals;*

*wherein in the receiver mode, the fourth means is configured to receive electrical signals from an electrical system coupled to the converter and the fifth means is configured to transmit optical signals corresponding to the received electrical signals;*

*wherein the mode selector is configured to switch the converter to receiver mode after the first means stops receiving optical signals; and*

*wherein the mode selector is configured to switch the converter to driver mode in response to the first means receiving optical signals at substantially the same time the fourth means is not receiving electrical signals.*

*36. The converter of claim 35, further comprising a delay circuit coupled to the second means, wherein the delay circuit is configured to delay the transmitted electrical signals corresponding to the received optical signals.*

*37. The system of claim 17, wherein the logic is operable in the receiver mode to cause optical signals corresponding to the first and second electrical signals to be transmitted at an optical transmitter.*

*38. A fiber optic converter, comprising:*

*a driver operable to provide output signals for transmission to a bus when the fiber optic converter is in a driver mode;*

*a comparator/receiver coupled to the bus, wherein the comparator/receiver is operable to receive input signals from the bus when the fiber optic converter is in a receiver mode;*

*a mode selector, wherein the comparator/receiver is further operable to compare the input signals received from the bus and to provide a float signal to the mode selector when the comparator/receiver determines that the signals are floating; and*

*a light monitor coupled to the mode selector, wherein the light monitor is operable to determine whether or not the fiber optic converter is receiving optical signals and to provide a light signal to the mode selector when the light monitor determines that the fiber optic converter is receiving optical signals;*

*wherein the mode selector is operable to receive the float signal from the comparator/receiver and to receive the light signal from the light monitor and to place the fiber optic converter into either the driver mode or the receiver mode based on the presence of the float signal and the light signal.*

* * * * *

UNITED STATES PATENT AND TRADEMARK OFFICE

CERTIFICATE OF CORRECTION

PATENT NO. : RE42,178 E
APPLICATION NO. : 11/409544
DATED : March 1, 2011
INVENTOR(S) : Baldwin, Jr.

It is certified that error appears in the above-identified patent and that said Letters Patent is hereby corrected as shown below:

On the Title Page, item (56), under "Other Publications", Line 2, delete "Buid" and insert -- Build --.

Column 13, line 42, in Claim 35, delete "*comprising*" and insert -- *comprising:* --.

Signed and Sealed this
Thirty-first Day of May, 2011

David J. Kappos
*Director of the United States Patent and Trademark Office*